(12) United States Patent
Baumann et al.

(10) Patent No.: US 9,246,374 B2
(45) Date of Patent: Jan. 26, 2016

(54) METHOD FOR IMPREGNATING A HIGH VOLTAGE INSULATION OF A WINDING BAR

(75) Inventors: Thomas Baumann, Wettingen (CH); Massimiliano Vezzoli, Remigen (CH)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 358 days.

(21) Appl. No.: 12/971,575

(22) Filed: Dec. 17, 2010

(65) Prior Publication Data

US 2011/0147981 A1  Jun. 23, 2011

(30) Foreign Application Priority Data

Dec. 22, 2009 (EP) ..................................... 09180305

(51) Int. Cl.
*B29C 70/44* (2006.01)
*H02K 15/12* (2006.01)

(52) U.S. Cl.
CPC .............. *H02K 15/12* (2013.01); *B29C 70/443* (2013.01)

(58) Field of Classification Search
CPC .. B29C 39/42; B29C 39/10; B29C 2791/006; B29C 70/443
USPC .................................................. 264/134, 257
See application file for complete search history.

(56) References Cited

U.S. PATENT DOCUMENTS

| | | | |
|---|---|---|---|
| 1,697,134 A | 1/1929 | Neely | |
| 3,531,751 A * | 9/1970 | Sargent | 336/209 |
| 3,866,316 A | 2/1975 | Takechi et al. | |
| 5,324,767 A | 6/1994 | Koyama et al. | |
| 6,531,082 B1 | 3/2003 | Klee | |
| 6,840,749 B2 * | 1/2005 | Klee | 425/116 |
| 2003/0003175 A1 | 1/2003 | Klee | |

FOREIGN PATENT DOCUMENTS

| | | |
|---|---|---|
| EP | 0831575 | 1/2001 |
| GB | 1068362 | 5/1967 |
| GB | 1098015 | 1/1968 |

OTHER PUBLICATIONS

European Search Report for EP Patent App. No. 09180305.6 (May 27, 2010).
Office Action from European Patent App. No. 09180305.6 (Jan. 21, 2013).

* cited by examiner

*Primary Examiner* — Alison Hindenlang
*Assistant Examiner* — Robert J Grun
(74) *Attorney, Agent, or Firm* — Buchanan Ingersoll & Rooney PC

(57) ABSTRACT

A method is for impregnating a high voltage insulation of a winding bar (10), the winding bar (10) having a conductive bar (1) around which layers of insulating mica tape defining said high voltage insulation are wrapped. The method includes enclosing the winding bar (10) in a flexible sleeve (3), applying a vacuum in the flexible sleeve (3) to extract the gases contained in the insulating mica tape, supplying an impregnating resin into the flexible sleeve (3) to impregnate the mica tape (2), and curing the resin. The impregnating resin is supplied into the flexible sleeve (3) at a pressure less than 1.5 bar.

10 Claims, 1 Drawing Sheet

METHOD FOR IMPREGNATING A HIGH VOLTAGE INSULATION OF A WINDING BAR

This application claims priority under 35 U.S.C. §119 to European App. No. 09180305.6, filed 22 Dec. 2009, the entirety of which is incorporated by reference herein.

BACKGROUND

1. Field of Endeavor

The present invention relates to a method for impregnating a high voltage insulation of a winding bar.

2. Brief Description of the Related Art

Winding bars have a conductive bar made of a plurality of interwoven strands, each having an insulating layer wrapped around its surface; the manufactured conductive bars have an insulation (main insulation) wrapped around their surface.

In order to manufacture the main insulation, typically a dry mica tape is wrapped around the conductive bar to define a plurality of layers that are then impregnated with a resin.

In this respect, U.S. Pat. No. 6,840,749 ("'749 patent") discloses a device for impregnating the mica tape layers of high voltage winding bars.

According to the '749 patent and with reference to FIG. 1, the conductive bar 1, with the dry mica tape 2 wrapped around it, is first covered over its entire length by a flexible sleeve 3.

Then the flexible sleeve 3 (preferably contained in clamp shaped tools 4 that accommodate the sleeve 3 and the conductive bar 1 with the mica tape 2) is inserted into a pressure resistant tank 5.

A vacuum is then applied in the flexible sleeve 3, in order to extract the air contained in the mica tape 2 (mica tape may contain up to 50% air).

Then, pressure is applied in the chamber 7 between the pressure resistant tank 5 and the flexible sleeve 3 and impregnating resin is injected into the flexible sleeve 3 to impregnate the mica tape 3.

As the sleeve 3 is flexible, the differential pressure between the pressure of the chamber 7 and the pressure within the flexible sleeve 3 (being the pressure with which the impregnating resin is injected into the flexible sleeve 3) causes the flexible sleeve 3 to press against the mica tape 2.

Then the resin is cured.

In order to achieve a quick impregnation (the resin deteriorates after a prefixed time), the impregnating pressure (i.e., the pressure of the resin entering the flexible sleeve 3 to impregnate the mica tape 2) is quite high, for example 10 bar; therefore the pressure in the chamber 7 (i.e., inside of the tank 5) must be higher than 10 bar.

Even if this method proved to be quite efficient, it needs the large pressure resistant tank 5 (to withstand the high pressure to be applied therein; pressure resistant tanks are very costly components and, for these particular kind of impregnating plants, they could cost as much as 50% of the total cost of the impregnating plant.

U.S. Pat. No. 3,531,751 discloses a coil around which a mica tape is wrapped and, around the mica tape, a layer of armor tape is applied with a portion of the coil that is not covered by it.

SUMMARY

One of numerous aspects of the present invention is therefore a method by which the aforementioned problems of the known art are addressed.

Another aspect of the invention includes a method with which the cost of the impregnating plant can be sensibly reduced.

A further aspect of the invention includes a method by which use of a pressure resistant tank is not needed.

Surprisingly, the winding bars manufactured by methods embodying principles of the present invention, proved to have better high voltage insulating properties than those realized with traditional methods.

BRIEF DESCRIPTION OF THE DRAWINGS

Further characteristics and advantages of the invention will be more apparent from the description of a preferred but non-exclusive embodiment of the method according to the present invention, illustrated by way of non-limiting example in the accompanying drawings, in which.

DETAILED DESCRIPTION OF EXEMPLARY EMBODIMENTS

Figure 1:
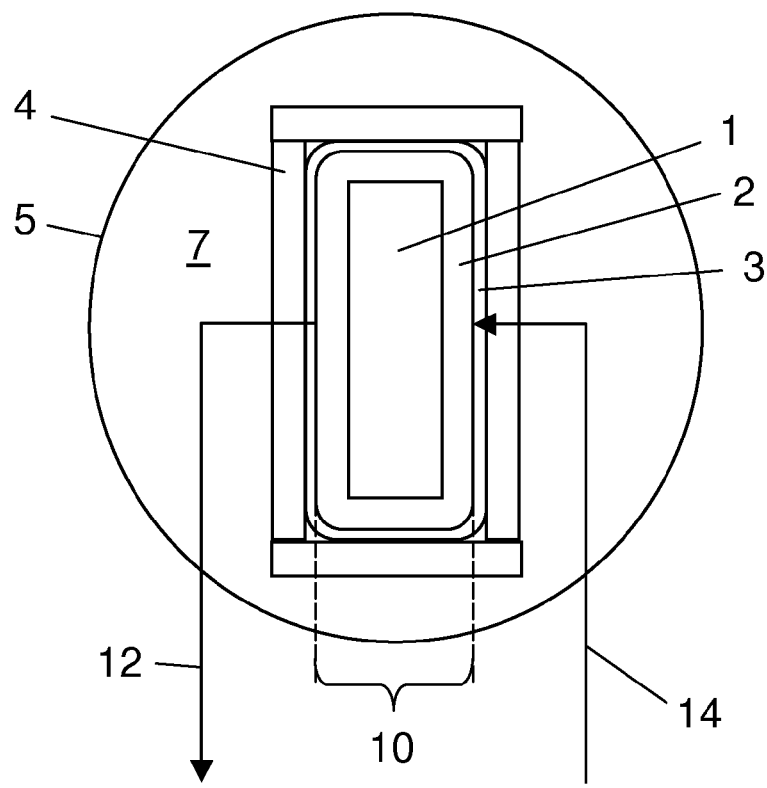
FIG. 1 is a schematic view of a device to implement a traditional impregnating method.
Figure 2:
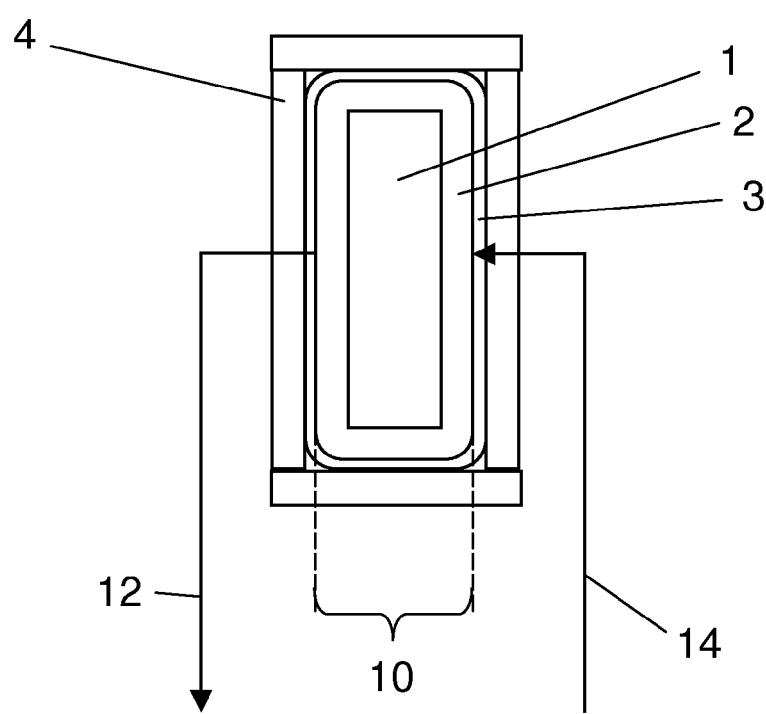
FIG. 2 is a schematic view of a device to implement an impregnating method in an embodiment of the invention.

With reference to FIG. 2, in which like references are used to refer to elements identical or similar to those elements already described, the winding bar 10 to be impregnated is made of a transposed conductive bar 1 (Roebel bar) having a main insulation 2 made of one or more mica tape layers wrapped around it.

An exemplary method for impregnating the insulation of the winding bar 10 includes the step of enclosing the winding bar 10 in a flexible sleeve 3.

The flexible sleeve 3 is tight or impervious at least to the gases contained in the insulating mica tape and the impregnating resin, at least at a pressure less than 1.5 bar.

The flexible sleeve 3 is a calibrated container, i.e., it has substantially the same dimensions as those of the winding bar 10 to be contained within it and its surfaces are substantially continually in contact with the surfaces of the winding bar 10.

The flexible sleeve 3 is of the same kind described in U.S. Pat. No. 6,840,749 and, in this respect, it has a line 12 connecting it to a vacuum forming system (not shown) and a supply line 14 for connecting it to a reservoir (also not shown) containing the impregnating resin.

Afterwards, vacuum is applied in the flexible sleeve 3 to extract the gases such as air contained in the insulating mica tape 2.

Typically a pressure of less than 2 mbar and preferably about 1 mbar is achieved within the flexible sleeve 3.

This operation is very important because mica tapes contain a large amount of gases that, if not removed before resin injection, would prevent the resin from performing a correct impregnation.

Afterwards, an impregnating resin is supplied into the flexible sleeve 3 to impregnate the mica tape 2.

Advantageously, the impregnating resin is supplied into the flexible sleeve 3 at a pressure being around the atmospheric pressure; for example, the pressure at which the impregnating resin is supplied into the flexible sleeve 3 is less than 1.5 bar and preferably between 0.75-1.25 bar.

Surprisingly, supplying impregnating resin at a pressure being substantially the atmospheric pressure proved not to increase or substantially increase the impregnating time with respect to traditional methods (requiring a high pressure resin supply).

In addition, the winding bars manufactured by a method embodying principles of the present invention surprisingly show better electric characteristics than those manufactured according to traditional methods.

In particular, tests showed that the dielectric constant and the lifetime are increased.

Then the resin is cured.

During curing resins shrink; typically resins used for impregnating mica tapes for high voltage winding bars insulation shrink of about 3% in volume.

As shrinking is quite large, its influence on the quality of the finished insulation is also large, such that reducing the resin supplying pressure does not substantially negatively affect impregnation.

In order to improve impregnation, also the resin viscosity may be controlled (the smaller the viscosity, the higher the resin flux that impregnates the mica tape).

Preferably, during impregnation the viscosity of the impregnating resin is less than 150 m Pa/s.

In this respect the resin may be warmed during impregnation and injection into the flexible sleeve 3.

In particular, the resin is warmed at a first temperature lower than the curing temperature.

Naturally the features described may be independently provided from one another.

The method conceived in this manner is susceptible to numerous modifications and variants, all falling within the scope of the inventive concept; moreover all details can be replaced by technically equivalent elements.

In practice the materials used and the dimensions can be chosen at will according to requirements and to the state of the art.

REFERENCE NUMBERS

1 conductive bar
2 main insulation
3 flexible sleeve
4 accommodating tool
5 tank
7 chamber
10 winding bar
12 vacuum line
14 resin supply line While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for impregnating a high voltage insulation of a winding bar having a conductive bar around which layers of insulating mica tape defining said high voltage insulation have been wrapped, the method comprising:
    enclosing the winding bar in a flexible sleeve, wherein surfaces of the flexible sleeve are continually in contact with the winding bar, the flexible sleeve including a line connecting it to a vacuum forming system;
    applying vacuum inside said flexible sleeve and extracting gases contained in the insulating mica tape with the vacuum;
    supplying an impregnating resin into said flexible sleeve to impregnate the mica tape at a pressure less than 1.5 bar; and
    curing the resin.

2. A method as claimed in claim 1, wherein supplying the resin comprises supplying the resin into the flexible sleeve at a pressure between 0.75-1.25 bar.

3. A method as claimed in claim 1, wherein applying vacuum comprises applying vacuum inside said flexible sleeve to reach a pressure of less than 2 mbar.

4. A method as claimed in claim 1, wherein applying vacuum comprises applying vacuum inside said flexible sleeve to reach a pressure of about 1 mbar.

5. A method as claimed in claim 1, wherein, during said supplying, a viscosity of the impregnating resin is less than 150 m Pa/s.

6. A method as claimed in claim 1, further comprising: warming the resin.

7. A method as claimed in claim 6, wherein warming the resin comprises warming to a first temperature lower than a curing temperature of said resin.

8. A method as claimed in claim 6, further comprising warming the resin during said enclosing, said applying, said supplying, or combinations thereof.

9. A method as claimed in claim 1, wherein the flexible sleeve is impervious to gases contained in the insulating mica tape and the impregnating resin, at least at a pressure less than 1.5 bar.

10. A method as claimed in claim 1, wherein supplying the resin comprises supplying the resin into the flexible sleeve at a pressure between 0.75 bar and less than 1.5 bar.

* * * * *